United States Patent [11] 3,536,113

[72] Inventor Garfield B. Sutherland
 267 Sunset Drive, St. Thomas, Ontario,
 Canada
[21] Appl. No. 692,749
[22] Filed Dec. 22, 1967
[45] Patented Oct. 27, 1970

[54] TREE HARVESTER
 31 Claims, 9 Drawing Figs.
[52] U.S. Cl. .................................................. 144/309,
 144/2, 144/3, 144/34
[51] Int. Cl. ..................................................... A01g 23/02
[50] Field of Search ............................................ 144/2(21),
 3(4), 34, 34(1—6), 208(3,5), 309(34), 2(21),
 208, 208(3.5)

[56] References Cited
 UNITED STATES PATENTS
 2,707,007 4/1955 Shuff ............................ 144/2
 3,356,113 12/1967 del Perugia ................... 144/34

Primary Examiner—Gerald A. Dost
Attorneys—Carl C. Batz and Andrew J Beck

ABSTRACT: A tree harvester including a device to be placed by a crane to a position on a tree, which while supported on the tree may top, delimb and sever the tree trunk into logs or bolts, through its own operation, as it descends the tree; also methods including a sequence of steps involving delimbing, cutting into bolts and piling the bolts, in harvesting the trees of the forest.

Patented Oct. 27, 1970
3,536,113
Sheet 1 of 5
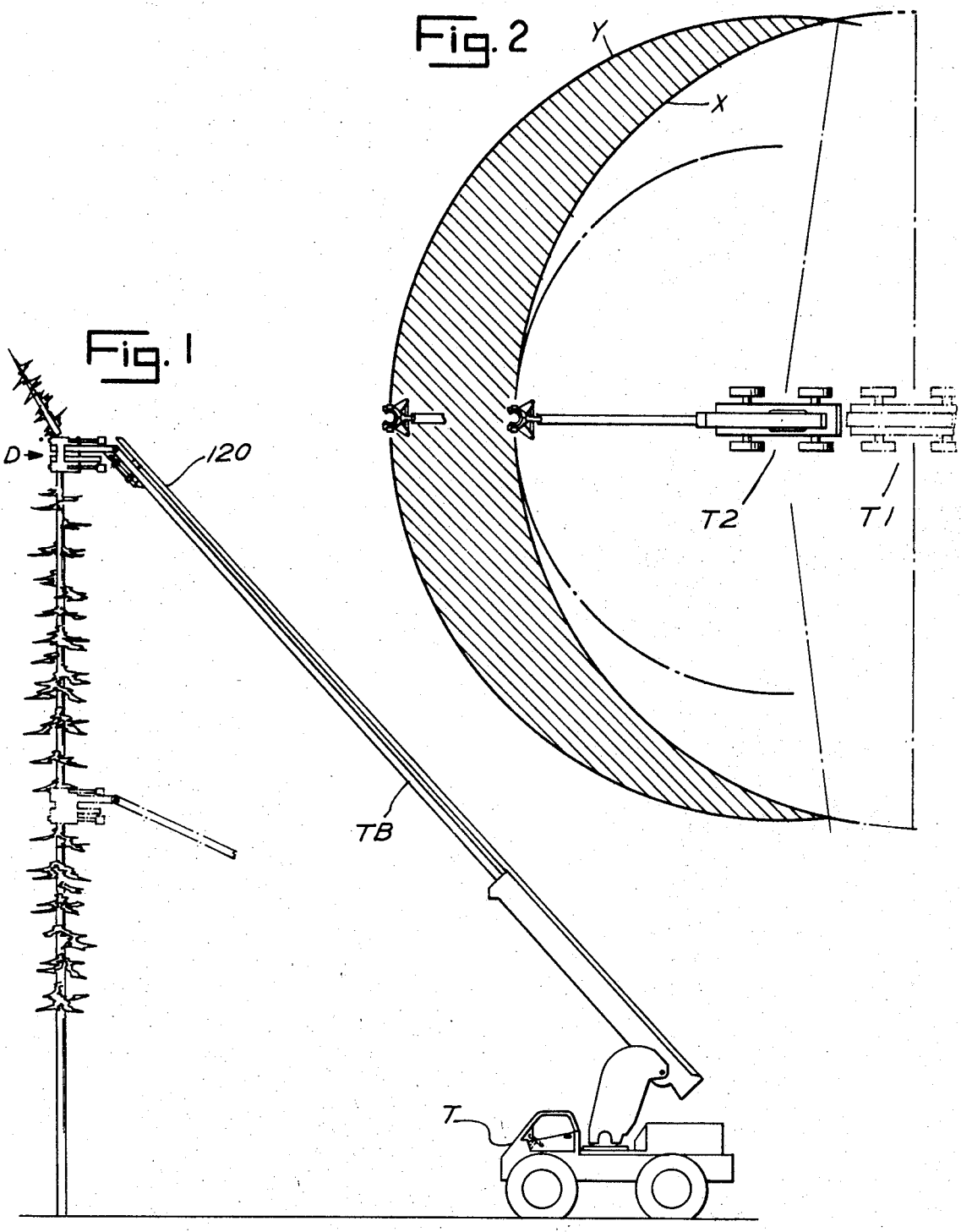
INVENTOR
GARFIELD B. SUTHERLAND
BY
Carl C. Batz
ATTORNEY

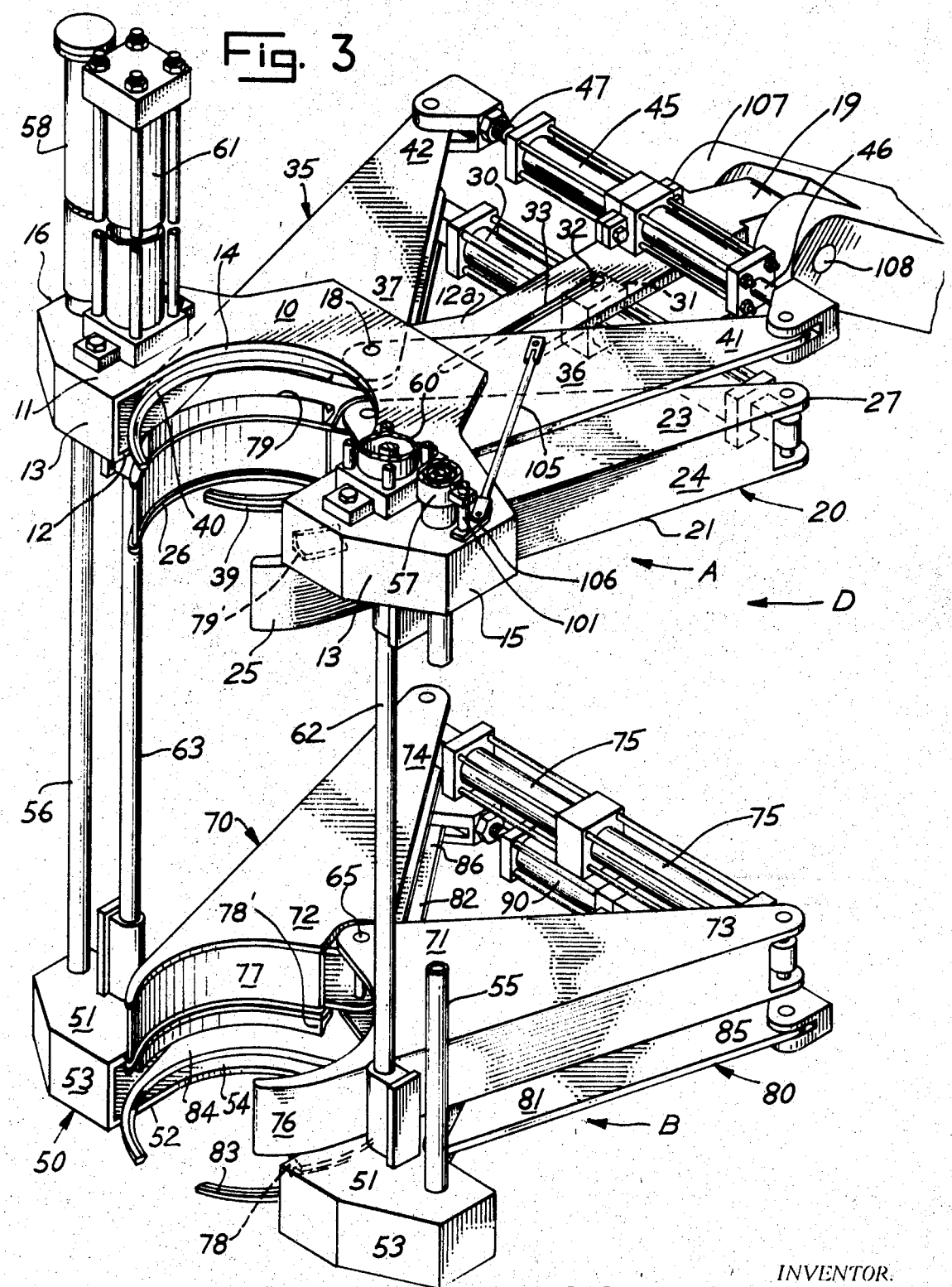

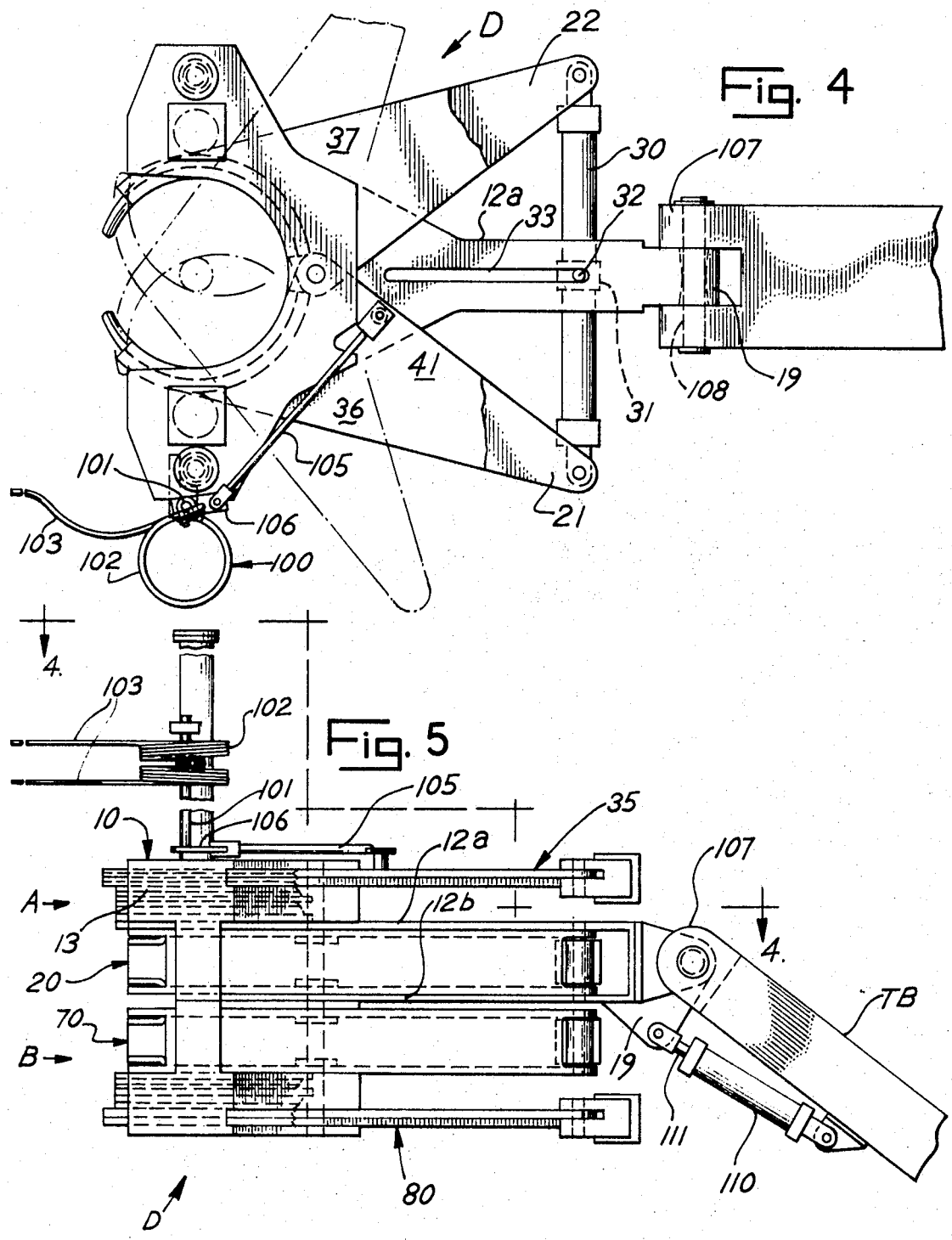

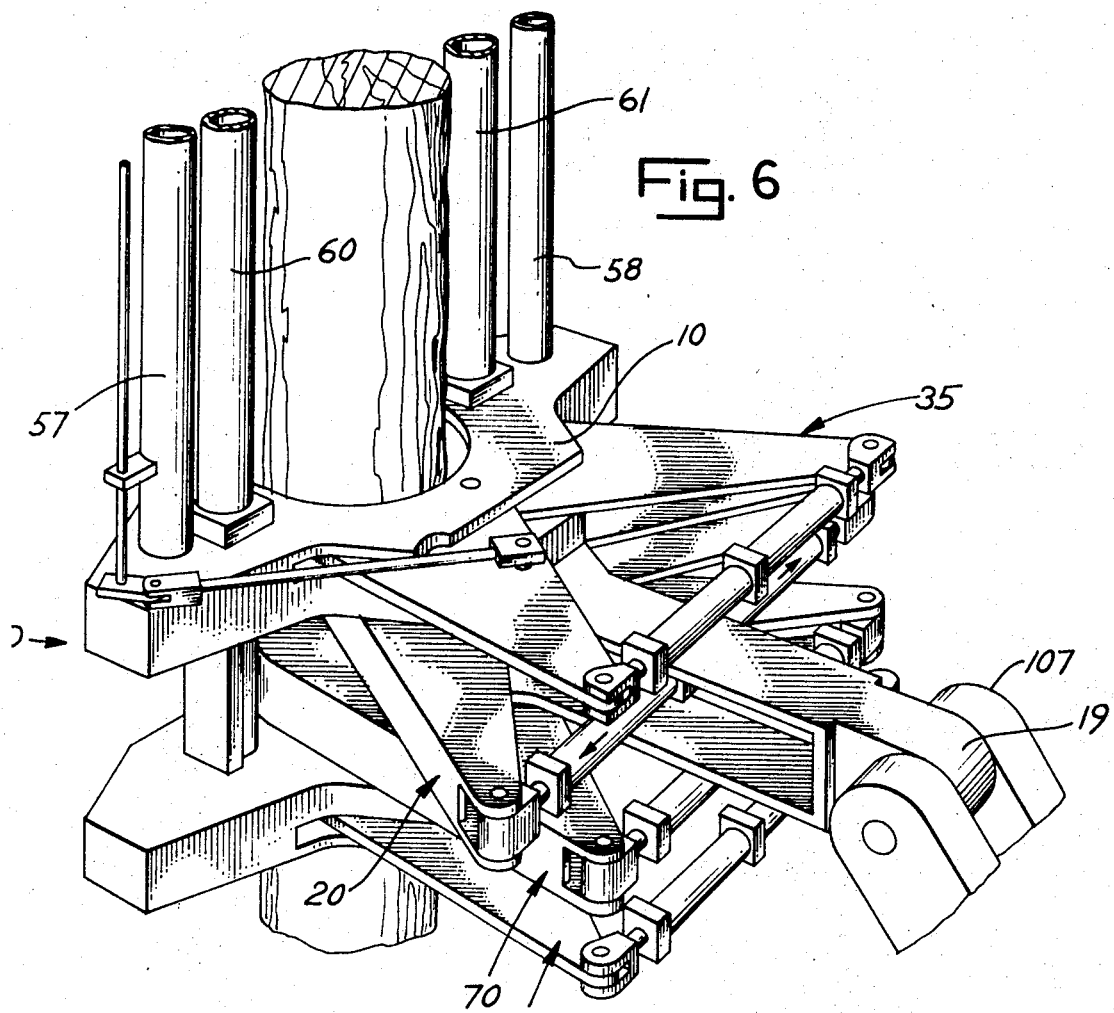
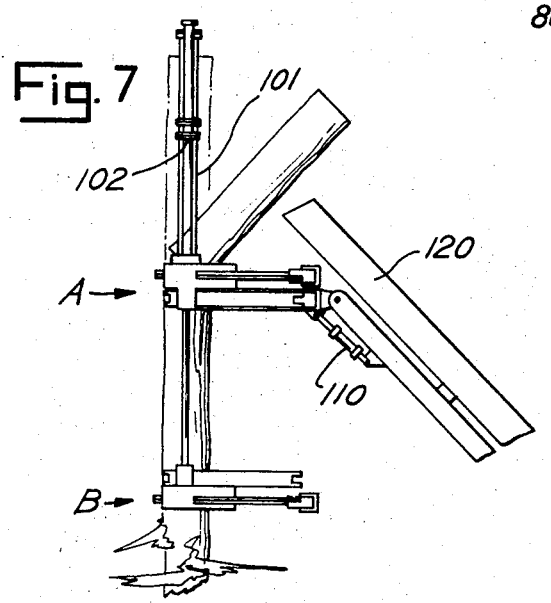
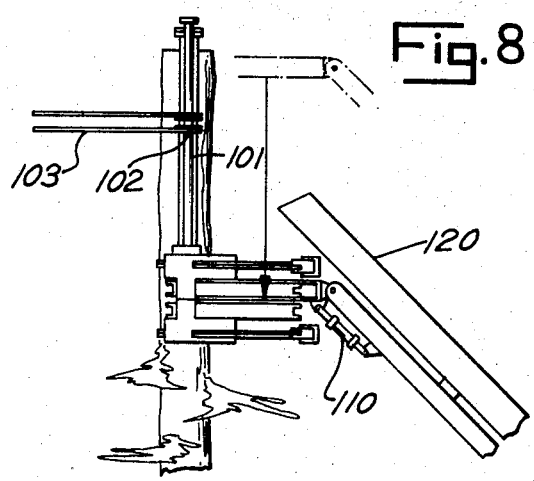
INVENTOR.
GARFIELD B. SUTHERLAND
BY Carl C. Batz
ATTORNEY

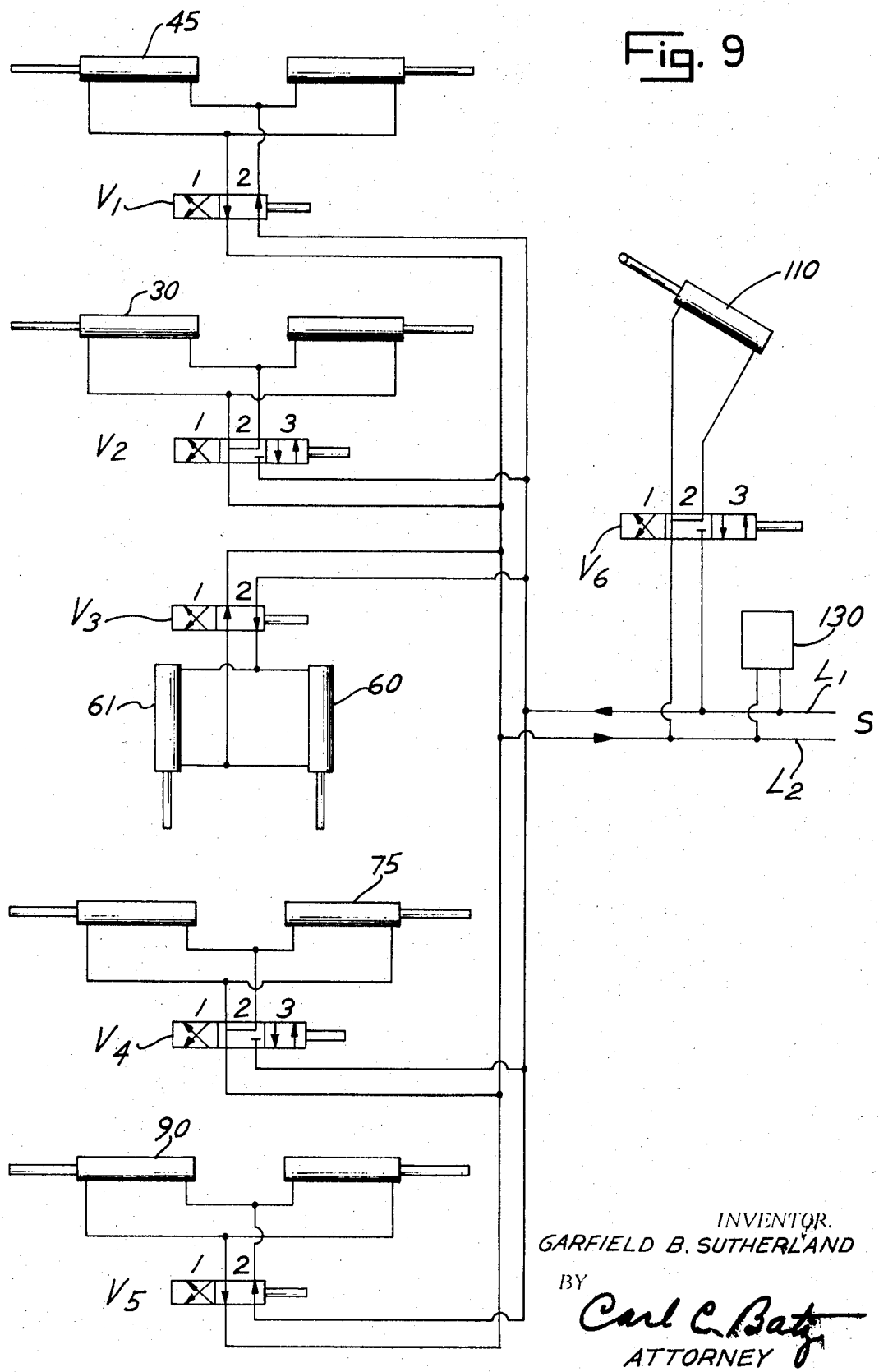

TREE HARVESTER

This invention pertains to tree harvesting equipment and more particularly to such equipment for delimbing and cutting trees into bolts and for transporting the bolts to positions where they may be transported for further processing. It pertains also to methods for harvesting the trees of the forest.

Until recent times the harvesting of trees for lumber or for use in making pulpwood has required a great amount of hand labor and many of the required hand operations entailed danger to the men performing these operations. In the traditional practice the tree is felled, topped, and the branches removed by use of saws and axes. Then the trunk is cut into lengths or bolts and the bolts drawn to positions where they can be loaded on trucks and carried to rail or waterways which transport them to the mill.

The industry has long sought effective ways to utilize machinery for performing the burdensome tasks which have been required in logging operations and to eliminate the need for expensive hand labor and time consuming operations.

Further, when trees are felled there is great likelihood of damaging other trees in the forest, and the industry has sought ways of avoiding this damage.

Machines have been provided which are capable of shearing the trees at their bases to fell the tree. See, for example, U.S. Pat. Nos. 2,876,816; 2,981,301; 3,059,667; 3,198,225; and 3,269,437. In some cases the felled tree or sections thereof are brought to a central station where they are passed through processing equipment to be delimbed, debarked or otherwise processed.

Machines have been devised in which a mast is placed alongside a tree and through operation of the mast and associated apparatus, the tree is delimbed, severed at its base and the entire tree turned and lowered into position with the mast. U.S. Pat. Nos. 3,252,487; 3,183,951; 3,238,981; 3,182,949; 3,183,952; 3,183,954; and 3,277,936 show machines of this type.

It has further been proposed that the tree be clamped to a mast and the lower bolt removed after which the tree is lowered along the mast and successive bolts removed from the lower end of the tree as it descends within the device. See U.S. Pat. No. 3,140,736.

None of the above-mentioned machines have entirely met the needs of the industry. In most cases the machines have been very large and expensive, and so cumbersome that as a practical matter they could not be maneuvered in the forest. None of the machines heretofore provided have supplanted the traditional logging methods which continue to be used.

It is an object of the present invention to provide tree harvesting apparatus which is effective to convert the standing tree into bolts of desired length without damaging standing trees and which is practical for operation in the forest.

Another object of the invention is to provide such apparatus which is relatively small and less expensive and which can be maneuvered into position in the forest with ease.

Another object is to provide such apparatus which will delimb the tree as well as to cut it into bolts and which has facility for gathering the bolts for transportation from the forest area.

Still another object is to provide a method and apparatus for severing bolts from a tree successfully from the top downwardly of the tree and a still further object is to provide apparatus which is supported by a tree and which can be moved downwardly along the tree to sever successive bolts from the tree.

Yet another object is to provide such apparatus which is power driven and which can be operated conveniently by a single operator.

Yet another object is to provide methods for performing the various functions of topping, delimbing, cutting the tree trunk into bolts while the tree is still standing, and for collecting and piling the bolts; and a still further object is to provide effective methods for harvesting the trees in a path through the forest.

To provide the methods and apparatus which are needed, I have turned to a new principle of operation and instead of first severing the tree at its base, I provide a device which can be attached to an upper position of a standing tree and the device then set in operation. As the device operates and descends along the tree, it performs the various functions of topping, delimbing, and cutting the tree trunk into bolts.

As a basis for understanding the principle of operation in my invention, we may think of an animal such as a cat or squirrel on the side of the tree near the top with the claws of its fore and hind feet engaging the tree to support itself on the tree. The animal bites off the top of the tree above its fore feet and while holding with its fore feet, stretches its hind feet downwardly on the tree to a new position where it holds with the claws of its hind feet, and then while holding with its hind feet moves its fore feet down and holds with the claws of its fore feet as it bites off another length of the tree, repeating this operation until it reaches the bottom. This rather homely analogy demonstrates an important principle of the invention.

According to my invention there is provided a tree harvesting device which is made in two sections, with section A being simulated by the top or fore part of the animal above referred to and section B the bottom or rear part of the animal. According to the new principle of operation, both sections A and B of the device attach themselves to the tree to be supported thereon. Tree severing mechanism carried by section A cuts off the top of the tree. Then section B moves downwardly of the tree to attach itself at a lower position, after which section A moves down to follow section B and is attached to the tree at the lowered position where the tree severing mechanism of section A may again operate to cut off the bottom of the first bolt. This operation may be repeated to sever successive bolts.

The device may attach to the boom of a crane and through operation of the crane, put up into position near the top of the tree where it can attach itself to the tree.

One embodiment of the invention is illustrated in the accompanying drawings, in which:

FIG. 1 is a view in elevation showing in full lines the position of the harvesting device when in position to top the tree and in dotted lines the position of the device after a few bolts have been cut;

FIG. 2 is a view from the sky and showing in the shaded part the additional area of the forest which may be served when the crane moves forwardly a distance from one position to the next along a path;

FIG. 3 is a perspective view of the device in accordance with this invention with section B extended downwardly, the better to show the elements of this section;

FIG. 4 is a top view of the device with parts being broken away as indicated at line 4—4 of FIG. 5;

FIG. 5 is a side view of the device;

FIG. 6 is a perspective view of the device attached to a tree in position to cut the bolt;

FIG. 7 is an elevational view after the bolt has been cut and the lower section is moving to a lower position;

FIG. 8 is an elevational view taken after the upper section has moved down to follow the lower section; and FIG. 9 is a diagrammatic view of a hydraulic system for operating the device.

DESCRIPTION

As illustrated (See FIG. 1), the improved apparatus includes the device D, having sections A and B, and a crane vehicle T having a boom TB which is attached at its end with the device D.

The device D is shown particularly in FIGS. 3—6. It comprises an upper section A and a lower section B. In the upper section A is a frame 10, a top clamping mechanism 20, and a top shearing mechanism 35; and in the lower section B is a frame 50, a lower clamping mechanism 70 and a lower shearing mechanism 80.

Referring to section A, the frame 10 is formed of an upper plate 11 and a lower plate 12 which are joined by sides 13. A central recess or cavity 14 opening at the front of the frame is provided for receiving the trunk of a tree (See FIG. 6). To the left of this recess is the left leg 15 of the frame, and to its right is the right leg 16 of the frame. The arcuate edges of the cavity 14 are rigid and capable of breaking off branches of a tree as the frame is moved up or down the tree.

A pin 18 is mounted vertically in frame 10 and has its top end secured in the plate 11 at a point just rearward of the cavity 14. This pin provides the pivot about which the top shearing and clamping mechanisms move.

The lower frame plate 12 extends rearwardly and is narrowed to form the frame extension 12a, which may be attached to the boom of a crane (See FIGS. 4 and 5) or other such apparatus. Spaced below the frame extension 12a is a second frame extension 12b, and at their rear ends extensions 12a and 12b are joined and provided with a tongue 19 for enabling attachment of the frame to the boom of a crane.

The top clamping mechanism 20 includes a left clamping member 21 and a right clamping member 22 each of which receives the pin 18 at its midsection and is pivotally movable about the pin. The clamping member 21 is formed of spaced plates 23 which are joined by sides 24. Forwardly of the pin, the member 21 has the jaw 25 which is arcuate in form. Clamping member 22 is similarly formed and, forward of the pivot, has the jaw 26 which is arcuate and complementary to jaw 25 so that when the jaws are closed about a tree, their outline conforms more or less with the circumference of the tree.

Rearwardly of the pivot, the clamping member 21 forms a lever and at its end is provided with a yoke 27. Clamping member 22 is similarly formed, so that one fluid cylinder 30 may have the piston rod at its one end pivotally attached to one end of the clamping member 21 and the piston rod of the opposite cylinder 30 pivotally attached to the end of the clamping member 22.

Cylinder 30 is blocked at its central portion and the blocking member 31 is provided with a pin 32 which, in the operation of the clamping mechanism, may slide in the slot 33 provided in the frame extension 12a. This provides equalization of the strokes of the two pistons and their rods of hydraulic cylinder 30.

Above the clamping mechanism 20 is the top shearing mechanism 35. This includes a pair of shearing members 36 and 37 each of which receives the pin 18 at its midsection. The blades 39 and 40 extend forwardly from the pin. These blades are arcuate and complementary with each other so that as the blades are closed about a tree, they conform more or less with the circumference of the tree. The rear legs 41 and 42 of the shearing members extend rearwardly of the pivot point. Fluid cylinders 45 which are blocked at their inner ends have piston and rod 46 at one end pivotally connected with the end of leg 41 and have piston and rod 47 at the other end pivotally connected with the end of leg 42.

Referring now to section B of the device (See FIGS. 3, 5, and 6), the lower frame 50 includes spaced plates 51 and 52 which are joined by the sides 53. Frame 50 has a central cavity 54 opening at the front, similar to the cavity 14 of the upper frame 10, into which the trunk of a tree may be received. Vertical guide rods 55 and 56 have their lower ends secured to the frame 50 and extend upwardly into the sleeves 57 and 58 respectively, and serve to keep the lower frame 50 aligned with the upper frame 10 as the sections A and B of the device move vertically with respect to each other.

Mounted on frame 10 are two vertical cylinders 60 and 61 respectively on the left and right-hand sides of the cavity 14. Pistons and rods 62 and 63 of cylinders 60 and 61 extend from their cylinders downwardly through frame 10 and have their lower ends secured in the lower frame 50. When these pistons and rods are withdrawn into their cylinders, the relative positions of sections A and B are as shown in FIG. 6, and when these pistons are extended to their maximum positions, the relative position of sections A and B are as shown in FIG. 3.

As in the case of the upper frame 10, the lower frame 50 has secured therein at a point back of the cavity 54, a vertically disposed pin 65 which provides the pivot for the lower clamping mechanism 70 and the lower shearing mechanism 80.

The lower clamping mechanism 70 may be formed in the same way and may be identical with the upper clamping mechanism 20, being adapted for movement by the clamp members 71 and 72 about pin 65. Forward of the pivot the clamping members 71 and 72 have the jaws 76 and 77. Extending between the ends of the rear legs 73 and 74 are the cylinders 75 which are blocked in their center and have the piston rod at one end pivotally attached to the end of leg 73 while the piston rod at the other end is pivotally attached to the end of leg 74.

The lower shearing mechanism 80 includes the shear members 81 and 82 disposed between the frame plates 51 and 52. These shear members may be constructed in the same way and may be identical to the members 36 and 37 of the upper shearing mechanism 35. They are provided at their forward portion with the blades 83 and 84 and have their leg portions 85 and 86 extending rearwardly.

A cylinder 90 extends between legs 85 and 86 and has the piston rod at one end pivotally connected with the end of leg 85 and has a piston rod at the other end pivotally connected with the end of leg 86.

To aid in the delimbing function I provide the arcuate knives 78 and 78' which are secured to the lower edges of the jaws 76 and 77 and which have their sharp edges directed downwardly. Similarly, I provide the arcuate knives 79 and 79' secured to the upper edges of the jaws 25 and 26.

The device as illustrated includes mechanism 100 for tipping the top of a tree forwardly of the device and for tipping the severed bolts rearwardly of the device. (See FIGS. 3 and 4). This mechanism includes a pivoted rod 101 mounted in the upper frame 10. Spring 102, carried by the rod 101, has a forwardly extending arm 103 which when the rod is turned clockwise moves around into contact with a bolt which may be within cavity 14 and may have been severed by shearing mechanism 35. The spring 102 and arm 103 are located above the shearing mechanism 35 a distance which is more than half the length of the usual bolt so that the arm will strike the bolt at a point above its center of gravity but will strike the severed top of a tree below its center of gravity, thus to tip the tree top forwardly of the device but to tip the bolts rearwardly of the device.

To energize the tipping mechanism there is a link 105 which at its rear end is pivotally attached to the top of leg 41 of the shearing member 36, and at its forward end is pivotally connected with the strap 106 which is secured to the rod 101. When the legs of the shearing mechanism 35 are opened as to shear off a bolt, the link 105 operates to turn the strap 106 and consequently the rod 101 clockwise to drive spring arm 103 against the tree bolt as it is severed, thus to tip the bolt rearwardly.

The device D is adapted for combination with a crane having an extensible boom, or with other transporting apparatus.

As shown in FIG. 1, the truck T may have the extensible boom TB which is preferably of the telescoping type. The end of the boom may be pivotally attached to the device D by means of the yoke 107 and pin 108. A cylinder 110 is pivotally attached at one end to the boom and has its piston rod pivotally attached to the tongue 19 of the upper frame 10. This cylinder serves to maintain a correct balance or attitude of the device D as the boom is moved in a vertical direction.

There is provided on the top side of the boom a chute 120 (See FIG. 7) into which the bolts may fall as they are severed and tipped rearwardly of the device. Within the chute the bolts slide downwardly and rearwardly leaving the lower end of the chute to form a pile at the rear of the truck T.

The crane may be hydraulically powered, and suitably the fluid cylinders mentioned in the foregoing description may be powered from the same hydraulic system. The controls for the system may all be contained in the cab of the crane so that the operator sitting in the cab can perform all the functions of the device from his position within the cab.

A hydraulic circuit suitable for operating the various functions of the device is schematically shown in FIG. 9 where the lines $L_1$ and $L_2$ extend to and from a source of hydraulic pressure S. Lines $L_1$ and $L_2$ extend to an accumulator 130 which stores fluid energy. The cylinders 45 which operate the top shearing mechanism 35 are connected through the valve $V_1$ to line $L_1$ and $L_2$; the cylinders 30 which operate the top clamping mechanism are connected through valve $V_2$ to lines $L_1$ and $L_2$; the cylinders 60 and 61 for moving sections A and B vertically with respect to each other are connected through valve $V_3$ to lines $L_1$ and $L_2$; cylinders 75 which operate the lower clamping mechanism are connected through valve $V_4$ to lines $L_1$ and $L_2$; cylinders 90 which operate the lower shearing mechanism are connected through valve $V_5$ to lines $L_1$ and $L_2$; and cylinder 110 which maintains the attitude of the device D is connected through the valve $V_6$ to Lines $L_1$ and $L_2$.

As shown, valves $V_1$ and $V_5$ which operate the shearing mechanisms and $V_3$ which operates the vertical cylinders are two-way valves in which position No. 1 retracts the pistons and position No. 2 extends the pistons. Valves $V_2$ and $V_4$ which operate the clamping mechanisms and $V_6$ which operates the leveling cylinder are three-way valves with position No. 1 retracting the pistons, position No. 3 extending the pistons, and position No. 2 representing the float position where the pistons are not impelled in either direction but are permitted to move when mechanical pressure is applied. Controls in the cab of the crane are arranged in a manner most convenient for the operator.

Trees to be harvested are commonly relatively tall—for example, from 45 to 60 feet in height—and have side limbs extending over only about the top two-thirds of their height. Especially in dense forest areas, the limbs are frail and can be cut or broken off easily, and my device is adapted to perform the delimbing function as well as the topping and the slashing or severing of bolts.

OPERATION

One practice of the invention is described as follows:
With the device D attached on the end of a crane, the operator elevates the boom while at the same time extending it until the device is at the level where the tree is to be topped. Then, with valves $V_1$ to $V_5$ set for retraction of the respective cylinders so as to open up all clamping jaws and shear blades, the operator operates $V_6$ to level the device and pushes the crane head forwardly using the regular crane controls until the tree trunk is received into the frame cavities 14 and 54. Then he moves valves $V_2$ and $V_4$ to position No. 3 which extends the pistons and tightens both clamping mechanisms about the tree after which he moves the boom control and the boom level control $V_6$ to float position. Then he may move valve $V_1$ to position No. 2, setting the top shearing mechanism into action, and at the same time, move valve $V_4$ to position No. 2 to throw the lower clamping mechanism into float position, and with the valve $V_6$ in float position, move valve $V_3$ into position No. 2.

When the top shearing mechanism has operated to sever the top of the tree, the tipping mechanism has operated to tip the tree top forwardly as previously explained and it falls forwardly to the ground. At the same time, with valve $V_4$ in float position, valve $V_3$ in position No. 2, the whole lower section B goes crashing downward with the limbs being broken through contact with the edge of the lower frame cavity 54 and then cut off somewhat closer by contact of the knives 78 and 78' on the lower edge of the jaws of the lower clamping mechanism. As the section B descends the jaws 76 and 77 are permitted to open somewhat to accomodate the slightly increasing diameter of the tree trunk.

The limbs and foliage removed from the tree fall to the earth at the base of the tree where they provide protection to young tree growth and fertilization of the soil.

When section B has reached its limit position, valve $V_4$ is changed to position 3 to close clamp jaws 76 and 77, then the valve $V_2$ may be changed to position No. 1 and valve $V_3$ changed to position No. 1 to open the top clamp and bring the section A down along the tree to a position adjacent Section B, after which valve $V_2$ may again be changed to position No. 3 to again tighten the top clamping mechanism, and the valve $V_1$ again moved to position No. 2 to again activate the top shearing mechanism to sever the first bolt. This time the tipping mechanism operates to tip the bolt rearwardly, as previously explained to cause the bolt to tip into the chute on top of the crane boom, and slide down the chute to the bolt pile at the rear of the truck.

The above operation may be repeated to sever and deliver successive bolts as the device moves downwardly along the tree.

The length of the bolts in the above operation depends on the length of the strokes of cylinders 60 and 61 which can be made any length desired. It is also possible to cut bolts of twice, three times or other multiples of the basic lengths by omitting the top shearing operation every other time or by omitting this shearing operation for two or more consecutive times before severing the bolt.

If it is desired that all bolts, including the lowermost bolt, next to the stump, shall be of the same length, then the original placement of the device at the top of the tree should be made so that there are multiples of the desired bolt length between the top shearing mechanism and the stump.

When making the last bolt, the downward movement of section B may be limited through contact of frame 50 with the ground or the top roots of the tree and when the operator moves valve $V_5$ to position No. 2, this closes the lower shear mechanism 80 to sever the last bolt. At this point the operator may either open the lower shear mechanism and operate the boom to raise device D permitting the last bolt to fall to the ground where it is cut, or he may raise the boom to carry the bolt upwardly to a height where, through operation of the attitude cylinders dump, the bolt backs into the chute 120. It is also possible for the operator to raise the boom on other occasions when there may not be sufficient slant of the chute to cause the bolts to slide down by gravity.

My device is versatile in its operation and may move upwardly on a tree as well as downwardly through its own operation. For example, with the shearing mechanisms in open position, the top clamping mechanism either open or in float position, and lower clamp mechanism closed on the tree, the operator may actuate the vertical cylinders 60 and 61 to raise section A, and then with the top clamping mechanism closed and the lower clamping mechanism open or in float position, again actuate cylinders 60 and 61 to retract their pistons and raise section B up to a level adjacent section A.

The delimbing operation may be accomplished also as the device is raised along the tree. In this case, the edges of the cavity 14 of the upper frame 10 can break the limbs and the knives on the top shearing mechanism more closely trim the branches.

It may be noted that after the device is placed on a tree and the clamping mechanisms energized, the boom may be placed on float operation so that no support is given to the device by the boom, and as the device is moved downwardly or upwardly on the tree, the boom may follow along but exert no actuating force on the device. The boom may be used, however, to raise the device as the final bolts are severed, and to move to the next tree to be harvested. The leveling cylinder 110 may be activated while the device is not supported on a standing tree, to maintain the device in a proper position with respect to the horizontal.

Another way to proceed in harvesting a tree is first to place the device D at the bottom of the tree and operate it to move upwardly of the tree breaking and cutting the branches on the way up, then when at the top where the top is to be severed, setting into operation the sequence of steps as heretofore described so that there is severing first of the top and then of successive bolts as the device descends. By this operation, the delimbing function is repeated to make bolts that have twice been subjected to the delimbing function.

My device may be used to harvest a path through the forest, and in this connection particular reference is made to FIG. 2 of the drawings. The truck may be placed as shown in dotted lines at T₁ and when in this position the boom swung from side to side and may be extended to place the device D on trees within the arc X. When the trees in this area have been harvested, the truck may be advanced to the position shown in solid lines at T₂ and in this new position the boom may be extended to place the device D on trees within the arc Y covering the additional crescent area which is cross hatched in FIG. 2. In this way the truck may be moved through the forest harvesting a path of trees.

While in the foregoing detailed description I have set out a specific embodiment of the invention, it will be understood that the structure and operation may be varied by those skilled in the art without departing from the spirit and scope of the invention.

I claim:

1. A tree harvester comprising first and second vertically spaced mechanisms for severing the trunk of a tree, means for fully supporting said mechanisms on a tree, said first mechanism being operable to sever the trunk of a tree when in one position on a tree and means for moving said harvester to a lower position on said tree while supported thereon whereby said second mechanism comes to be operable to sever said trunk at said lower position.

2. A tree harvester as set forth in claim 1 wherein said moving means is operable to move said mechanisms successively to lower positions on said tree to enable successive operation of said severing means to sever said trunk into successive bolts.

3. A tree harvester as set forth in claim 1 including separate delimbing blade means independent of said mechanisms for delimbing the tree.

4. A tree harvester comprising a frame, mechanism mounted on said frame for severing the trunk of a tree, means for supporting said frame on a tree, means for moving said frame downwardly from one position on said tree to a lower position on said tree while it is still supported by said tree, and means for actuating said mechanism at each position of said frame to provide a bolt which has been severed at each end, wherein said frame includes an upper section and a lower section, wherein said supporting means includes clamping mechanism in said upper section and clamping mechanism in said lower section, and wherein said moving means is operable to move one of said sections vertically with respect to the other section.

5. In a tree harvester device a frame having an upper section and a lower section, upper clamping mechanism mounted on said upper section, lower clamping mechanism mounted on said lower section, each of said mechanisms being effective for releasably attaching its frame to the trunk of a tree to support said device on the tree, and means for moving said lower section to a lower position along said tree when said upper clamping mechanism is engaged and said lower clamping mechanism is released and for moving said upper section toward said lower section when said upper clamping mechanism is released and said lower clamping mechanism is engaged.

6. A device as set forth in claim 5 wherein the lower section of said frame has a cavity for receiving the trunk of the tree and is adapted when said section is lowered to break branches of the tree.

7. A device as set forth in claim 5 including hydraulic power means for actuating said moving means.

8. A device as set forth in claim 5 including hydraulic power means for actuating said clamping mechanisms and said moving means.

9. A device as set forth in claim 5 including shearing mechanism for severing the trunk of the tree mounted on said upper section of the frame and operable to shear said trunk when said upper section is in position on said tree and also when said upper section is at said lower position on said tree.

10. A tree harvester as set forth in claim 9 including shearing mechanism mounted on said lower section of the frame for shearing the bottom of the last bolt from said tree.

11. A device as set forth in claim 9 which includes a pin which is mounted vertically in the upper frame section and provides the pivot about which each of the shearing mechanism and the top clamping mechanism operate.

12. A device as set forth in claim 5 including knives carried in said lower section for cutting limbs from the tree as said lower section is moved to said lower position.

13. A tree harvester as set forth in claim 12 including means for placing said frame at said one position on said tree.

14. A tree harvester as set forth in claim 13 in which said placing means includes a crane having a boom which is pivotally attached to said frame.

15. A tree harvester as set forth in claim 14 wherein said boom is a telescopic boom.

16. A tree harvester as set forth in claim 14 including means for maintaining said frame in predetermined relationship with the horizontal at different vertical positions of the frame.

17. A device as set forth in claim 14 including hydraulic means for actuating said boom and control means for conditioning said hydraulic means to permit movement of said boom but without the application of moving force on said frame as said frame is moved downwardly on said tree.

18. A tree harvester as set forth in claim 14 including a chute carried on top of said boom into which bolts cut from said tree may fall and pass downwardly to a point of collection.

19. A device as set forth in claim 5 including means for maintaining said upper clamping mechanism aligned with said frame so as to prevent turning of the frame as said clamping mechanism is actuated.

20. A device as set forth in claim 19 in which said means for maintaining alignment includes a slotted frame extension and fluid cylinder attached to said clamping mechanism and having an upwardly extending pin extending into the slot of said frame extension whereby said pin may move within said slot as said clamping mechanism is actuated.

21. In a tree harvester device, a frame having an upper section and a lower section, upper clamping mechanism mounted on said upper section, lower clamping mechanism mounted on said lower section, each of said mechanism being effective for releasably attaching its frame to the trunk of a tree, and means for moving said upper section to an upper position along said tree when said upper clamping mechanism is released and said lower clamping mechanism is engaged and for moving said lower section toward said upper section when said upper clamping mechanism is engaged and said lower clamping mechanism is released.

22. A device as set forth in claim 21 wherein said upper section has a cavity into which the trunk of said tree may be received and which is effective to break branches of said tree as said upper section is moved to said upper position.

23. A device as set forth in claim 22 including a knife carried by said upper section for cutting the limbs of said tree as said upper section is moved to said upper position.

24. A method of harvesting trees utilizing a tree severing device supported on a telescopic boom adapted to be placed in a float condition comprising placing the boom supported tree severing device at a position adjacent the top of a tree, placing the boom in the float condition and supporting the severing device solely on the tree, severing the tree while said device is in said position, while said device is solely supported on said tree, moving the device downwardly along the tree to a new position and while said device is still solely supported by said tree, actuating said device at its new position to sever the tree a second time.

25. A method of harvesting trees comprising placing a tree severing device at a position on a tree so that the device is supported thereon, severing the tree while said device is in said position, while said device is supported on said tree, moving the device downwardly along the tree to a new position and while said device is still supported by said tree, actuating said device at its new position to sever the tree a second time, clamping said device to said tree at said first mentioned position to cause the device to be supported thereon before severing the tree the first time, clamping the device to said tree at a lower position on said tree before moving said device downwardly.

26. A method for harvesting trees comprising mounting a tree severing device on the end of the boom of a crane, elevating the boom to bring the said device into position at the upper portion of a tree, clamping said device to the tree, placing the boom in float condition in which it gives no further support to said device, actuating said device to sever the tree at the position in which it is clamped, moving said device downwardly along said tree while clamped thereto to a new position along said tree, and again actuating said device to sever said tree at said new position to provide a tree bolt severed at each end.

27. A method as set forth in claim 26 in which said severing and moving steps are repeated to provide a series of tree bolts severed at each of their ends.

28. A method as set forth in claim 27 in which said boom is swung laterally and moved to place said device in position to harvest trees within an arc determined by the length of the boom, and in which after harvesting trees within said arc said crane is advanced to a new position where the boom may be moved to place the device in position on trees within a new arc determined by boom length in said new position.

29. A method of harvesting trees comprising placing a tree severing and delimbing device at a position on a tree so that the device is solely supported thereby, severing the tree while said device is in said position, while said device is supported by said tree, moving the device downwardly along the tree to a new position to delimb the same and while said device is still supported by said tree, actuating said device at its new position to sever the tree a second time.

30. A tree harvester comprising mechanism for severing a standing tree into a plurality of sections, a longitudinally extensible telescopic boom for positioning said mechanism, said boom adapted to be pivotally mounted on a vehicle for pivotal movement about a horizontal axis and to be angularly disposed relative to a tree, tree section delivery means connected to and substantially coextensive with said boom adapted to receive sections severed from the tree and convey the same to a location adjacent the vehicle, said mechanism including tree section fall directing means for directing the fall of certain of the severed sections to said delivery means.

31. A tree harvester according to claim 30 wherein said tree section delivery means includes a chute fixed to said boom and extending longitudinally coextensive therewith, said tree section fall directing means including a pivotal arm to direct the fall of certain of the sections into said chute.